United States Patent [19]

Pedersen

[11] 3,727,338
[45] Apr. 17, 1973

[54] TUBULAR CASTING ROD HAVING AN AXIALLY-ENCLOSED LINE

[76] Inventor: Donald K. Pedersen, 924 Hoyes Avenue, Racine, Wis. 53405

[22] Filed: Sept. 7, 1971

[21] Appl. No.: 178,040

[52] U.S. Cl. ............................43/18 R, 287/58 CT
[51] Int. Cl. .................................A01k 87/00
[58] Field of Search .....................43/18 R, 18 GF; 285/302; 287/58 CT

[56] References Cited

UNITED STATES PATENTS

| 2,729,012 | 1/1956 | Lee | 43/18 R |
| 2,324,429 | 7/1943 | Rondelli | 43/18 R |
| 1,441,045 | 1/1923 | Tredwell | 43/18 R X |
| 3,417,500 | 12/1968 | Carabasse | 43/18 R |
| 3,447,254 | 6/1969 | Sobel et al. | 43/18 R |

FOREIGN PATENTS OR APPLICATIONS

| 1,418,258 | 10/1965 | France | 43/18 R |

Primary Examiner—Hugh R. Chamblee
Assistant Examiner—James H. Czerwonky
Attorney—Axel H. Johnson

[57] ABSTRACT

A casting rod for use in fishing, comprising a tubular rod. The fishing line is entirely enclosed within the bore of the rod and passes from a casting reel axially through the rod and the eyelet at the tip, thus avoiding tangling, snagging and other injuries to the line. The rod is made in similarly tapered, telescoping sections to permit it to be collapsed without disturbing the line. The larger end of the first section is mounted on a rod handle frame. The interior dimensions of the second telescoping section are substantially equal to the exterior dimensions of the first section at respective points along their lengths. The second section collapses exteriorly over the length of the first section in the direction of the frame. Tapered sleeve means are provided to position the larger end of the second section on the smaller end of the first section.

3 Claims, 5 Drawing Figures

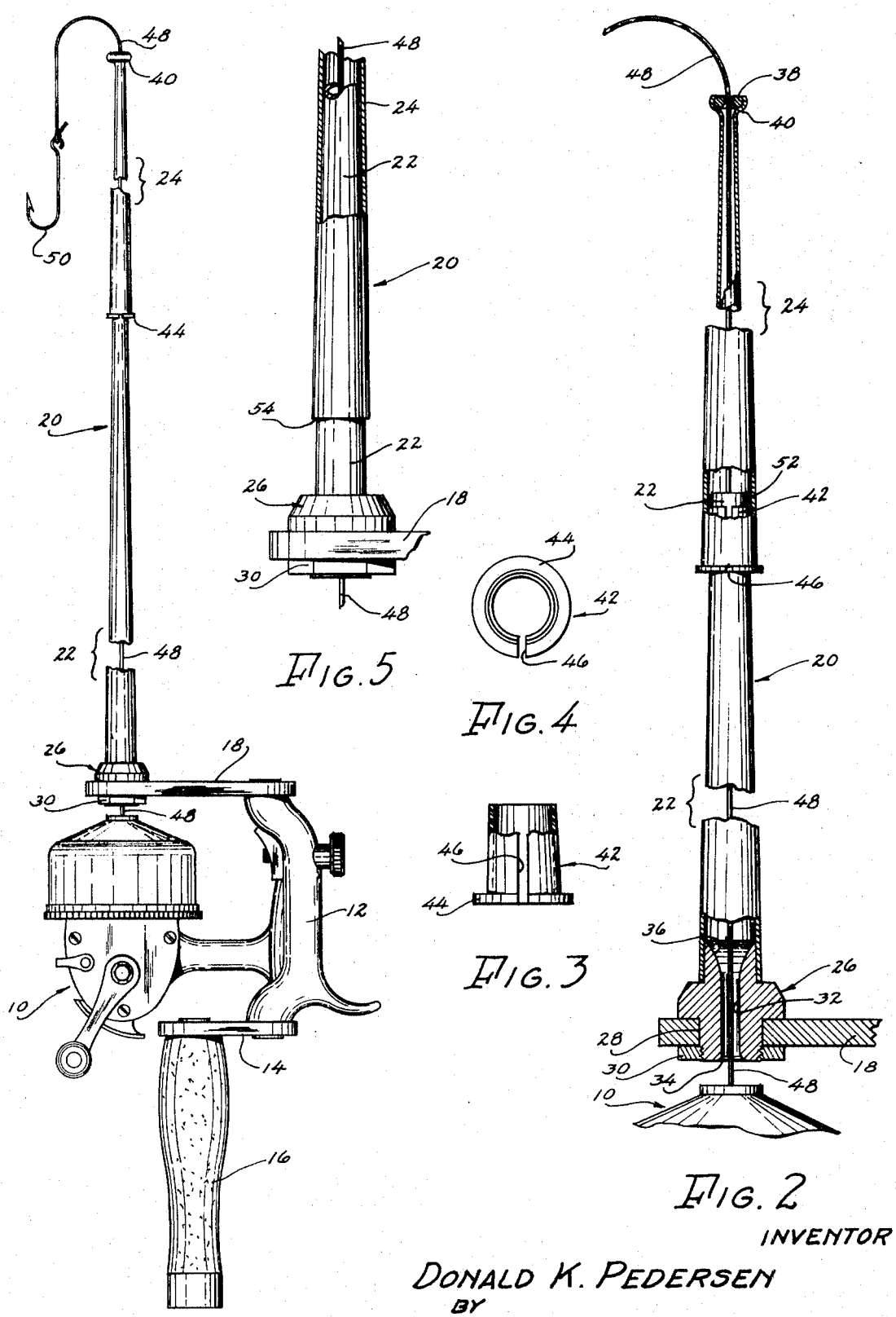

ND AXIALLY-
TUBULAR CASTING ROD HAVING AN AXIALLY-ENCLOSED LINE

BACKGROUND OF THE INVENTION

1. Field of the Invention

This invention concerns a casting rod for fishing. The fishing line passes through the tubular rod from the spinning reel to the tip of the rod. The line is therefore maintained in an untwisted and unsnagged condition and protected from other damage. The rod may be in one piece or made in several telescoping sections, with means to permit collapsing it for storage; the line remaining undisturbed within the bore of the rod.

2. Description of the Prior Art.

The applicant is not presently aware of tubular casting rods having means to enclose the fishing line within the bore thereof, or which rods are capable of being collapsed in the manner shown.

SUMMARY OF THE INVENTION

The gist of this invention is to provide a tubular casting rod, preferably provided with a spinning-type of reel. The fishing line passes from the reel through the bore of the rod, and then through a co-axial eyelet at the tip of the rod. One object of this invention is to enclose the line and to protect it from damage caused by kinking and knotting, and other damage when being transported. Another object is to provide only one guide for the line, thus eliminating considerable friction caused by a number of guides. Another object is to provide a casting rod that can be collapsed when not in use, without disturbing the line.

Further objects and advantages of this invention will become apparent from a consideration of the following detailed description taken in connection with the accompanying drawing wherein an embodiment of the invention is shown. It is, however, to be understood that the invention is not not limited to the details disclosed, but includes all such variations as fall within the spirit of the invention.

Referring to the drawing:

FIG. 1 is a view of a rod embracing this invention with a hook attached to the line, and ready for use.

FIG. 2 is an enlarged view of a portion of FIG. 1, and partly in section.

FIG. 3 is a view of a sleeve used to axially locate one section of the rod relative to the adjoining section.

FIG. 4 is an axial view of the sleeve of FIG. 3.

FIG. 5 is a view showing the relative positions of the sections when the sleeve has been removed and the sections of the rod have been collapsed axially.

Referring to FIG. 1, the rod embracing this invention comprises preferably, a spin casting reel 10 mounted in the customary manner on a frame member 12. The preferred type of reel is that in which the line passes from the reel on an axis common to the spool thereof. A handle arm 14 is integral with frame 12, being secured thereto in any suitable manner. A handle 16, of cork or other suitable material is secured to arm 14. A rod-support arm 18 is also secured integrally to frame 12.

Casting rods are customarily tapered, being of a maximum diameter at the handle end and of a minimum diameter at the tip, so as to provide the necessary flexibility. In the preferred form, the rod 20 comprises a first rod portion 22 of tapered tubing, and a second rod portion 24 ending in a line guide, both sections having identical tapers, so that when the rod is collapsed for transport, it will appear as in FIG. 5.

The first tubular section 22 is fixed integrally to a flange 26 by any method such as brazing or welding. Flange 26 comprises a reduced portion 28 which is passed through an opening in arm 18. Portion 28 is provided with a threaded portion which receives a nut 30 in order to secure the flange 26 integrally to the arm 18. Flange 26 is provided with an axial bore as at 32. One end of bore 32 is chamfered as at 34 to prevent wear or fraying of the line. The other end 36 of bore 32 is considerably flared to reduce wear of the line and to reduce the difficulty of threading the line through the rod sections 22 and 24. A final rod section 24 terminates in an eyelet or guide 38 which is of glass or other suitable material, and is secured in the tip of section 24 by forming the rod end over the guide as shown at 40.

When the collapsed rod, as shown in FIG. 5, is to be extended as shown in FIGS. 1 and 2, a sleeve 42 is provided, preferably of a plastic material. Sleeve 42 has inner and outer surfaces which conform to the tapers of sections 22 and 24, respectively, and of dimensions to axially fix the sections 22 and 24 in the relative position shown in FIGS. 1 and 2, when the rod is extended. An enlarged rim 44 permits the sleeve to be gripped by the fingers for easy removal of the sleeve when collapsing the rod. A longitudinal slot 46 is provided in sleeve 42 for a purpose to be later described terminating at end 52 opposite rim 44.

The customary fish line 48 of Nylon or other suitable material is threaded from the reel 10 through bore 32 of flange 26, passing axially through sections 22 and 24, and from guide 38, preferably when the sections are collapsed as in FIG. 5. The hook 50 or other tackle is secured to line 48 when the rod is being prepared for use.

When preparing the collapsed rod for use, the section 24 is separated axially from section 22 so that sleeve 42 can be placed over line 48 by means of slot 46. Sleeve 42 is then inserted into the end 54 of section 24. Section 22 is then inserted into sleeve 42 until the joint is secure and rigid.

It is to be understood that a plurality of shorter rod sections may be preferred in order to permit collapsing the rod to a shorter space. This modification would require additional sleeves 42; one being inserted at each joint in the manner indicated in FIG. 2. It is also to be understood that rod 20 may be of a single length of tubing if so desired.

The above being a complete description of an illustrative embodiment of the invention, what is claimed as new and desired to be secured by Letters Patent of the United States is:

1. A casting rod for fishing, comprising a frame, a reel supported on said frame and supplying a fishing line, a tubular rod member having a longitudinal passageway to receive said line axially therethrough, said rod comprising a first and a second portion, said portions being of like taper converging from said frame, the interior dimensions of the second portion being substantially equal to the exterior dimensions of the first portion at respective points along their lengths, said first portion having its larger end mounted on said frame, said second portion exteriorly collapsible over the length of said first portion in the direction of said frame, and means to position the larger end of said second portion on the smaller end of said first portion in an axially-extended position relative to said first portion, said means comprising an axially-tapered sleeve member interposed peripherally between the outer surface of said first portion and the inner surface of said second portion.

2. A casting rod as set forth in claim 1, in which said sleeve is slotted axially.

3. A casting rod as set forth in claim 1, in which said sleeve is provided with a rim to abut the extremity of said second portion.

* * * * *